United States Patent
Lee et al.

(10) Patent No.: US 6,748,196 B2
(45) Date of Patent: Jun. 8, 2004

(54) TRANSMIT OUTPUT CONTROLLING CIRCUIT AND METHOD OF A WIRELESS MOBILE COMMUNICATION SYSTEM

(76) Inventors: Kon-Hee Lee, 3-408, Imkwang Apt., 694, Sangkye-dong, Nowon-gu, Seoul (KR), 139-200; In-Hee Lee, 407-1, Seochun-ri, Kiheung-eup, Yongin-shi, Kyonggi-do (KR), 449-906

( * ) Notice: Subject to any disclaimer, the term of this patent is extended or adjusted under 35 U.S.C. 154(b) by 618 days.

(21) Appl. No.: 09/771,988

(22) Filed: Jan. 30, 2001

(65) Prior Publication Data

US 2002/0102953 A1 Aug. 1, 2002

(51) Int. Cl.[7] .................................................. H04B 1/00
(52) U.S. Cl. ...................... 455/69; 455/127.1; 455/126; 455/522; 455/67.11
(58) Field of Search ............................... 455/126, 127.1, 455/127.5, 522, 574, 226.1, 226.2, 67.11, 67.14, 68, 69, 63.1

(56) References Cited

U.S. PATENT DOCUMENTS

| | | | | |
|---|---|---|---|---|
| 5,669,066 A | * | 9/1997 | Borg et al. | 455/226.2 |
| 5,862,476 A | * | 1/1999 | Hasegawa | 455/432.2 |
| 6,512,931 B1 | * | 1/2003 | Kim et al. | 455/522 |
| 6,546,260 B2 | * | 4/2003 | Esmailzadeh et al. | 455/127.1 |
| 6,580,919 B1 | * | 6/2003 | Saito | 455/69 |
| 6,628,924 B1 | * | 9/2003 | Miyamoto | 455/69 |
| 6,628,956 B2 | * | 9/2003 | Bark et al. | 455/63.1 |

* cited by examiner

Primary Examiner—Edward F. Urban
Assistant Examiner—Lana Lee
(74) Attorney, Agent, or Firm—Antonelli, Terry, Stout & Kraus, LLP

(57) ABSTRACT

A transmit output controlling circuit and method of a wireless mobile communication system comprises a demodulating portion for detecting an immediate frequency of a receive information induced through an antenna and passing through a duplexer portion; a receive sensitivity measuring portion for detecting a receive sensitivity level of the immediate frequency signal detected by the demodulating portion; a controller for receiving data from the demodulating portion and outputting a receive sensitivity data, a timing control signal and a transmit power control signal; a transmit signal control a receive sensitivity data into a transmit signal according to the receive sensitivity data and the timing control signal from the controller; a transmit output amplifying portion for amplifying the transmit signal from the transmit signal control; and a transmit power control for controlling an amplification factor of the transmit output amplifying portion according to the control signal from the controller, so that the transmit output level is controlled according to the receive sensitivity and the communication distance, thereby reducing the power consumption in a local communication.

2 Claims, 2 Drawing Sheets

TRANSMIT OUTPUT CONTROLLING CIRCUIT AND METHOD OF A WIRELESS MOBILE COMMUNICATION SYSTEM

BACKGROUND OF THE INVENTION

The invention is related to a wireless mobile communication system, and particularly, to providing a transmit output controlling circuit and method for controlling a transmit output level corresponding to a receive sensitivity between a master and a slave, alternatively.

In other words, the transmit output controlling circuit and method is as follows: the slave transmits a predetermined data corresponding to the receive sensitivity together with the data information transmitted from the master, and the master controls the transmit output level catching up with the receive sensitivity of the slave, thereby reducing the power consumption in a local communication.

PRIOR ART

A conventional wireless mobile communication system using FRS transmits data information at a maximum transmit output irrelevant to a local or remote communication. If the wireless mobile communication system receives the data information in a short distance, its output is unnecessarily strong. It has problems in taking a bad effect on another communication and consuming the power over what is required.

A conventional wireless mobile communication method is as follows: a same frequency channel is set between a master and a slave for the communication. As the master transmits a predetermined information, the slave receives the information from the master and measures the receive sensitivity. If the receive sensitivity is excessively strong, the slave lowers its transmit output. But, when the master receives the information from the slave, the receive sensitivity is relatively lower, because the transmit output of the slave was already reduced. It has a problem in that the transmit output of the master cannot be controlled.

Accordingly, in order to resolve these problems, a main object of the invention is to provide a transmit output controlling circuit and method of a wireless mobile communication system for controlling a transmit output level according to a receive sensitivity of a counterpart to be communicated.

The other object of the invention is to provide a transmit output controlling circuit and method of a wireless mobile communication system for controlling a transmit output level according to a communication distance, thereby reducing the power consumption in a local communication.

SUMMARY OF THE INVENTION

According to the invention, a transmit output controlling circuit of a wireless mobile communication system comprises a demodulating portion for detecting an immediate frequency of a receive information induced through an antenna and passing through a duplexer portion; a receive sensitivity measuring portion for detecting a receive sensitivity level of the immediate frequency signal detected by the demodulating portion; a controller for receiving data from the demodulating portion and outputting a receive sensitivity data, a timing control signal and a transmit power control signal; a transmit signal control a receive sensitivity data into a transmit signal according to the receive sensitivity data and the timing control signal from the controller; a transmit output amplifying portion for amplifying the transmit signal from the transmit signal control; and a transmit power control for controlling an amplification factor of the transmit output amplifying portion according to the control signal from the controller.

A transmit output controlling method of a wireless mobile communication system comprises steps of judging whether a receive signal exists at a waiting mode of the communication system or not, measuring a receive sensitivity if the receive signal is inputted at the receive signal existence judging step; judging whether the sensitivity level measured is over a setting value; mixing a responding transmit data into the receive sensitivity and then transmitting the mixed data; forcing another communication system in a receive mode to detect a receive data; judging whether a sensitivity measuring data exists in the data detected at the receive data detecting step; controlling a transmit output level according to the sensitivity measuring data detected at the sensitivity measuring data existence judging step and transmitting a data for the communication.

BRIEF DESCRIPTION OF THE DRAWINGS

The invention now will be described in detail with reference to the accompanying drawings, in which.

DETAILED DESCRIPTION OF THE INVENTION

Figure 1:
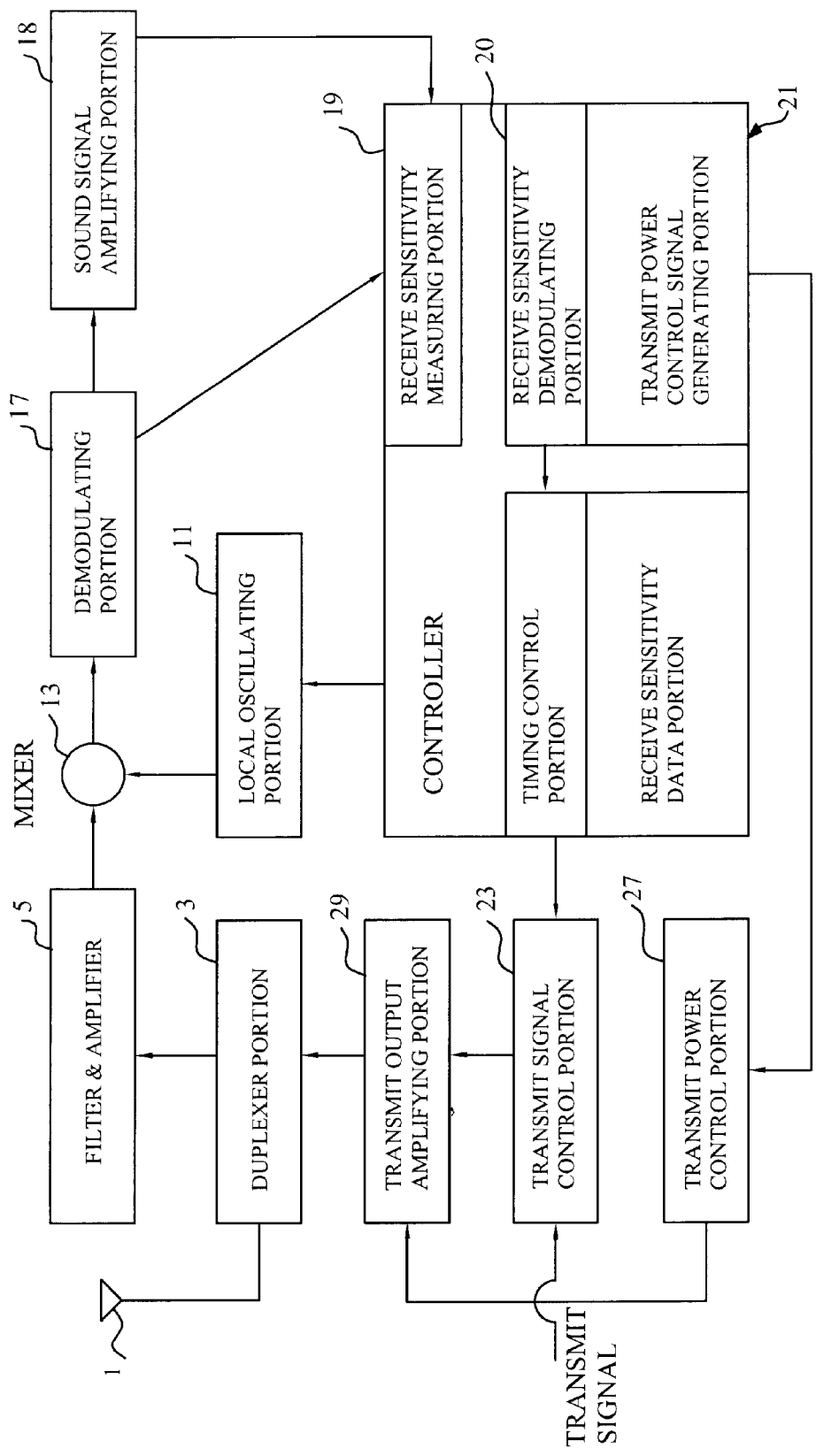
FIG. 1 is a block diagram illustrating a transmit output controlling circuit of a wireless mobile communication system according to the invention.

Referring to FIG. 1, a wireless mobile communication system comprises a transmit output controlling circuit. A filter and amplifier 5 filters and amplifies only a constant band frequency of a transmit signal induced by an antenna from a master and passing through a duplexer portion 3. A mixer 13 mixes the signal amplified from the filter/amplifier 5 with a local oscillating signal from a local oscillating portion 11 and supplies a mixed signal to a demodulating portion 17. The demodulating portion 17 detects an immediate frequency and outputs a sound signal. A sound signal amplifying portion 18 amplifies the sound signal.

A receive sensitivity measuring portion 19 receives the intermediate frequency signal from the demodulating portion 17. A receive sensitivity demodulating portion 20 receives a receive sensitivity data carried in the sound signal from the sound amplifying portion 18.

A controller 21 processes a receive sensitivity measured by the receive sensitivity measuring portion 19 and a receive sensitivity data demodulated by the receive sensitivity demodulating portion 20 and generates a timing control signal and a transmit power control signal. Concretely, the controller 21 judges the receive sensitivity by the receive sensitivity measurement. If the receive sensitivity is excessive or weak, the controller 21 considers the input thereto as the receive sensitivity and outputs the timing control signal and the transmit power control signal. Also, the controller 21 detects the sensitivity data in the signal from the demodulating portion 17.

A transmit signal control portion 23 adds a receive sensitivity data to a transmit signal according to the timing control signal and the transmit power control signal from the controller 21. A transmit output amplifying portion 29 amplifies the transmit signal from the transmit signal control portion 23. A transmit power control 27 controls the transmit output amplifying portion 29 to adjust transmit output level.

Figure 2:
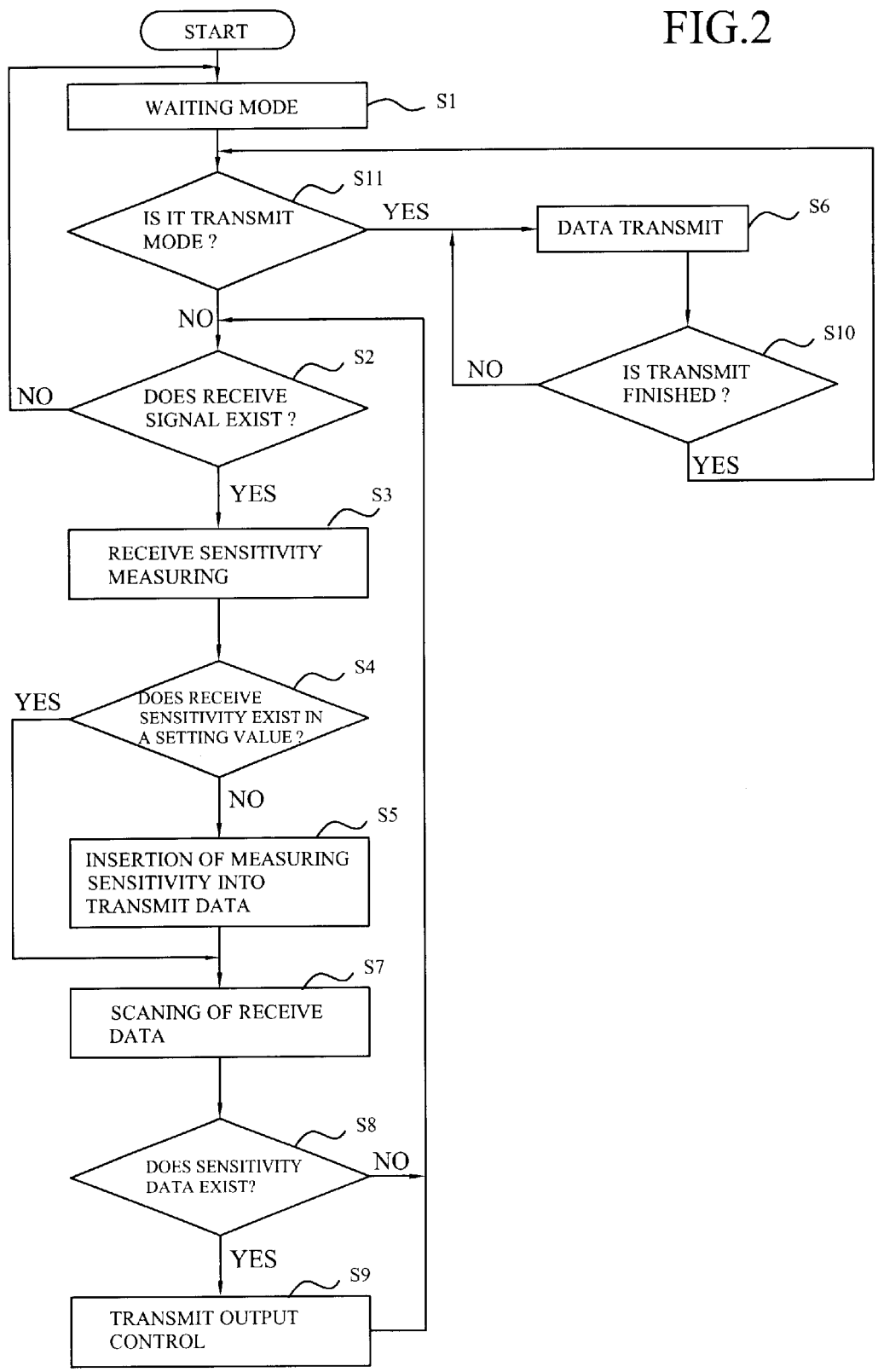
FIG. 2 is a flow chart illustrating a transmit output controlling method of a wireless mobile communication system according to the invention.

The operating of the transmit output controlling circuit as described above now will be described in detail with reference to a flow chart of FIG. 2. As a power source is applied to the wireless mobile communication system provided with the transmit output controlling circuit, the wireless communication system is switched into a waiting mode at step S1. Step S1 goes to step S11 that the controller 21 checks or judges whether the communication system is in a transmit mode. If not, step 11 proceeds to step 2 that the controller 21 judges whether a receive signal exists through the demodulating portion 17. In other words, the antenna 1 induces a transmit signal from a master into the communication system and supplies it through the duplexer portion 3 to the filter and amplifier 5. The filter and amplifier 5 filters and amplifiers only the constant band frequency of the transmit signal and supplies the amplified signal to the mixer 13. The mixer 13 mixes the mixed signal with a frequency from the local oscillating portion 11 and supplies the mixed signal to the demodulating portion 17. The modulating portion 17 demodulates the mixed signal to supply the intermediate frequency signal to the receive sensitivity measuring portion 19 constituted as an analogue/digital converter and the sound signal to the sound signal amplifying portion 18. At the same time, the sound signal amplifying portion 18 applies the receive sensitivity data carried on the sound signal to the receive sensitivity demodulating portion 20.

As described above, if the controller 21 receives the data, it measures the receive sensitivity at step S3 and judges whether the receive sensitivity is the setting value at step S4. If the receive sensitivity is not the setting value, step 4 goes to step S5 that the controller 21 supplies to the transmit signal control portion 23 the timing control signal that is generated by a timing control for mixing a measuring sensitivity data with a transmit data and a transmit power control signal, and the transit signal control portion 23 transmits a data inserting the measuring sensitivity data into the transmit data through the transmit output amplifying portion 29.

On the other hand, after the transmitting of the sensitivity measuring data, step S5 goes to step S7 that the receive data is checked out or scanned. At step S8, it is judged whether the sensitivity measuring data exists in the receive data. If so, step S8 goes to step S9 that the controller 21 applies the transmit power control signal to the transmit power control portion 27, the transmit power control portion 27 determines an amplification factor to apply the control signal to the transmit output amplifying portion 29. Therefore, the transmit output amplifying portion 29 forces the amplified signal through the duplexer portion 3 and the antenna 1 to be transmitted to another communication system like step 10.

At step S11, if the communication system is in the transmit mode, step 11 proceeds to step 6 that the data is transmitted. Next, at step 10, it is judged whether the transmit operating is finished. If the transmit is terminated, step 10 goes to step 11.

As described above, according to the invention, a transmit output controlling circuit of a wireless mobile communication system has advantages in that a slave inserts a data corresponding to a receive sensitivity into a transmit signal and transmits the inserted signal for the communication, and a master controls a transmit output level according to the receive sensitivity of the slave to correct its transmit output based on a sensitivity deviation of the slave, thereby reducing the power consumption in a local communication and decreasing the influence on another communication based on a proper transmit output level.

What is claimed is:

1. A transmit output controlling circuit of a wireless mobile communication system comprising:

a demodulating portion for detecting an immediate frequency of a receive information induced through an antenna and passing through a duplexer portion;

a receive sensitivity measuring portion for detecting a receive sensitivity level of the immediate frequency signal detected by the demodulating portion;

a controller for receiving data from the demodulating portion and outputting a receive sensitivity data, a timing control signal and a transmit power control signal;

a transmit signal control a receive sensitivity data into a transmit signal according to the receive sensitivity data and the timing control signal from the controller;

a transmit output amplifying portion for amplifying the transmit signal from the transmit signal control; and, a transmit power control for controlling an amplification factor of the transmit output amplifying portion according to the control signal from the controller.

2. A transmit output controlling method of a wireless mobile communication system comprising steps of:

judging whether a receive signal exists at a waiting mode of the communication system or not, measuring a receive sensitivity if the receive signal is inputted at the receive signal existence judging step;

judging whether the sensitivity level measured is over a setting value;

mixing a responding transmit data into the receive sensitivity and then transmitting the mixed data;

forcing another communication system in a receive mode to detect a receive data;

judging whether a sensitivity measuring data exists in the data detected at the receive data detecting step; and, controlling a transmit output level according to the sensitivity measuring data detected at the sensitivity measuring data existence judging step and transmitting a data for the communication.

* * * * *